United States Patent
Kennedy (10) Patent No.: US 8,272,597 B2
(45) Date of Patent: Sep. 25, 2012

(54) AIRCRAFT WATER DRAINAGE SYSTEM

(76) Inventor: Thomas William Kennedy, Richardson, TX (US)

( * ) Notice: Subject to any disclaimer, the term of this patent is extended or adjusted under 35 U.S.C. 154(b) by 96 days.

(21) Appl. No.: 12/807,008

(22) Filed: Aug. 26, 2010

(65) Prior Publication Data
US 2012/0048405 A1  Mar. 1, 2012

(51) Int. Cl.
*B64D 11/00*  (2006.01)
(52) U.S. Cl. .................... 244/118.5; 244/129.1
(58) Field of Classification Search ............... 244/118.5, 244/129.1, 136; 137/565.01
See application file for complete search history.

(56) References Cited

U.S. PATENT DOCUMENTS

| | | | | |
|---|---|---|---|---|
| 4,632,067 A * | 12/1986 | Carlson | ................. | 123/25 A |
| 5,309,938 A * | 5/1994 | Ellgoth et al. | ................. | 137/334 |
| 8,043,500 B2 * | 10/2011 | Murg | ................. | 210/192 |
| 2004/0186634 A1* | 9/2004 | Lucky et al. | ................. | 701/3 |
| 2005/0126927 A1* | 6/2005 | Lindauer et al. | ................. | 205/743 |
| 2008/0087039 A1* | 4/2008 | Reed et al. | ................. | 62/498 |
| 2008/0267820 A1* | 10/2008 | Murg | ................. | 422/33 |
| 2009/0212161 A1* | 8/2009 | MacKulin et al. | ................. | 244/129.1 |
| 2010/0133155 A1* | 6/2010 | Nolan | ................. | 210/98 |

\* cited by examiner

*Primary Examiner* — Christopher P Ellis
*Assistant Examiner* — Medhat Badawi (57) ABSTRACT

A potable water system capable of being drained in flight. The system provides positive separation between the potable and gray water systems. The design of the system will allow draining of components such as water tanks or interconnect lines that are below the level of the drain point. The systems will allow draining of components such as water tanks or interconnect lines that would not gravity drain due to the routing of their interconnect lines. This invention would apply to aircraft that need the capability to drain their potable water system in flight.

10 Claims, 12 Drawing Sheets

AIRCRAFT WATER DRAINAGE SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention Art

The present invention relates generally to the potable and gray water systems on board commercial and general aviation aircraft and the capability to drain their potable water system in-flight.

2. Description of the Related Art

More and more airports are imposing stringent rules and regulations regarding the dumping of fluids on the tarmac area whether it is potable water, gray water, or more hazardous materials like hydraulic fluids, or engine oils. Potable water systems need to be drained for a variety of reasons such as general aircraft maintenance, sterilization, and cold weather storage. Typical water systems have provisions to drain potable water on the ground through a skin port. Draining the potable water system in-flight is one way to eliminate the need to dump the potable water on the tarmac. Discharging liquid in-flight presents two problems: first the liquid may freeze at the exit point; second, it may come in contact with the skin of the aircraft and form an ice block which is hazardous to people in the ground. Both of those problems are overcome with the use of a heated drain mast. Heated drain masts are currently used to drain gray water overboard in flight. Federal Food and Drug Administration rules require physical separation between the potable water system and the gray water system to prevent potable water contamination. Dual port heated drain masts currently allow the drainage of both the potable and gray water systems with the required separation.

Most business jets and commercial size aircraft are delivered from the original equipment manufacturer with at least one, and commonly two, single port drain masts. Retrofitting the aircraft with a dual port drain mast can be accomplished by replacing the single port drain mast with a dual port drain mast. To retrofit an aircraft that already has two single port drain masts, it is advantageous to replace the aft most drain mast such that drainage from the new dual port drain mast is less likely to form an ice block on the exterior of the aircraft or other exterior components such as antennas and inlet ducts fairings. However, on certain aircraft the aft most drain mast location may be above the lowest level of one or more of the potable water tanks and/or their interconnect lines, which prohibits sufficient gravity draining of the tanks.

Draining the potable water system can be accomplished through a single port drain mast dedicated to the potable water system. In some cases this drain mast may need to be installed above the lowest level of the potable water tank and/or portions of the potable water interconnect lines. In those cases, potable water cannot be sufficiently drained using gravity.

SUMMARY OF INVENTION

One object of this invention is to provide the required separation between potable and gray water systems by installing an additional single port drain mast dedicated to the potable water system, which can be used to sufficiently drain the potable water system despite being above the lowest level of the potable water tank or portions of the potable water interconnect lines.

Another object of this invention is to provide the required separation between potable and gray water systems by installing a dual port drain mast, which can be used to sufficiently drain the potable water system despite being above the lowest level of the potable water tank or portions of the potable water interconnect lines.

Another object of this invention is to provide a system and method to use either the potable water pressurization system and/or the cabin differential pressure to push water up to the level of a dual port drain mast or a dedicated potable water drain mast that is installed above lowest level of one or more potable water tanks or interconnect lines. This will allow the potable water tanks to be sufficiently drained in flight.

Another object of the invention is to facilitate drainage of potable water tanks through potable water lines that are routed in such a way that they would prevent drainage without the use of the potable water pressurization system or cabin differential pressure.

BRIEF DESCRIPTION OF THE SEVERAL VIEWS OF DRAWINGS

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which:

In FIG. 4, the three position selector valve is set to allow distribution of the water throughout the system, while preventing water from draining through the drain mast.

FIG. 5 depicts the embodiment of FIG. 4 with a different setting for the three position selector valve.

FIG. 6 depicts the embodiment of FIG. 4 with another different setting for the three position selector valve. In FIG. 6, the three position selector valve is set to allow water to drain from the distribution lines between the check valve and the three position selector valve.

In FIG. 8, the three position selector valve is set to allow distribution of the water throughout the system, while preventing water from draining through the drain mast.

FIG. 9 depicts the embodiment of FIG. 8 with a different setting for the three position selector valve.

FIG. 10 depicts the embodiment of FIG. 8 with another different setting for the three position selector valve. In FIG. 10, the three position selector valve is set to allow water to drain from the distribution lines between the check valve and the three position selector valve.

DETAILED DESCRIPTION OF INVENTION

If a user of an aircraft desires to drain a potable water system in flight, and the drain point is above the lowest level of the water system, whether the lowest level of the water system is the lowest point of the potable water tank, the supply lines, the interconnect lines, or any other portion of the water system, the water must be forced uphill to be adequately drained. The preferred embodiment of the current invention uses the pressure source from the potable water system, e.g., a compressor, a pump, or bleed air from the aircraft engines, to push the water from the lowest portion of the water system up to the drain point, which can be a multiple-port drain mast or a dedicated single port drain mast.

Figure 1:
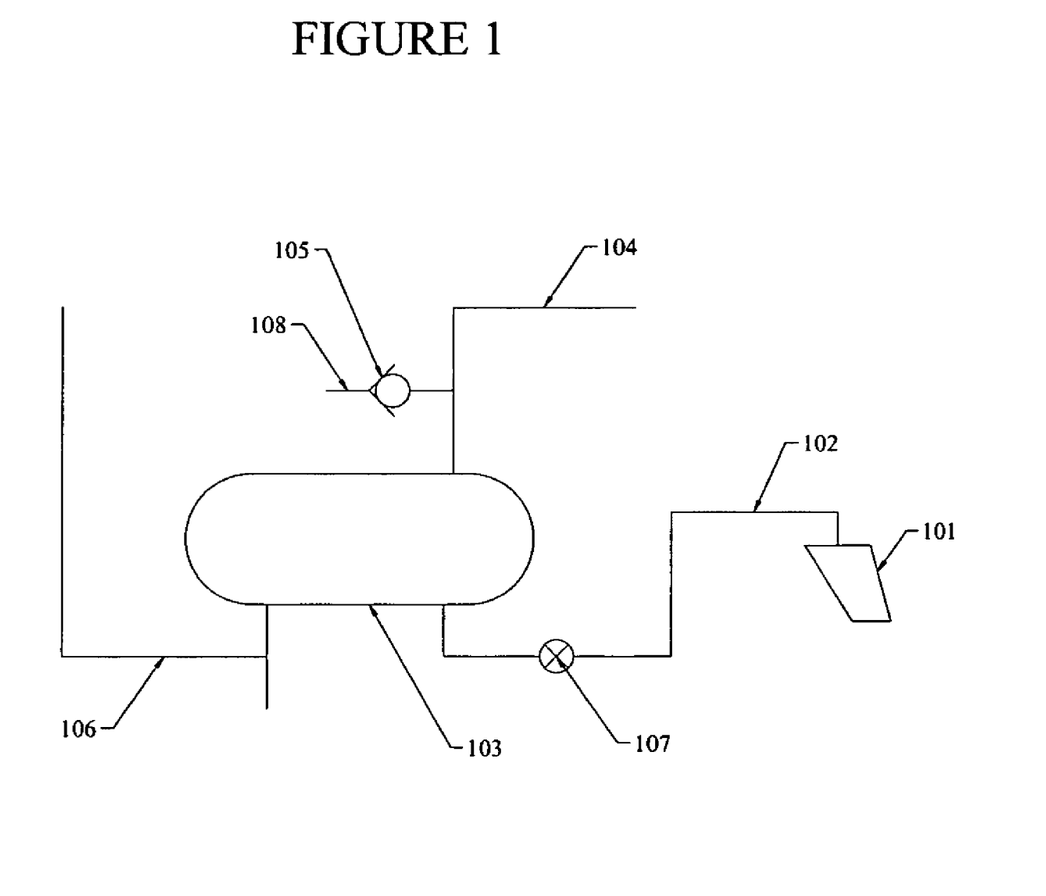
FIG. 1 depicts an embodiment of the present invention with a single water tank, in which a portion of the tank and a portion of the plumbing lines connecting the tank to a single port drain mast are located below the level of the single drain mast.

FIG. 1 shows a schematic representing a configuration of an aircraft water system in which a portion of a potable water tank is below the top of the drain mast as well as portions of its interconnecting plumbing. This positioning is in contrast to a drain mast that is located below the water tank and its interconnecting plumbing such that the tank would sufficiently drain from the force of gravity. But, physical constraints of the aircraft sometimes dictate that the drain mast be installed in a location where the tank and interconnecting plumbing cannot sufficiently drain using the force of gravity. As such some other force must be used to adequately drain the tank and interconnect line. FIG. 1 depicts a drain mast and interconnecting plumbing placement in which the tank cannot sufficiently drain using gravity. As such, some other force must be used if the tank is to be sufficiently drained. The embodiment depicted in FIG. 1 uses the pressure system associated with delivering water throughout the plane to drain the tank and interconnecting plumbing.

During normal use of the system shown in FIG. 1, water is delivered as needed to portions of the aircraft by pressure that is supplied to the system through the pressure supply line 104 into tank 103. During the normal supply of water, valve 107 is closed, and check valve 105 is closed with check valve 105 being closed by the pressure on the system. Water is then forced to the points of use through the supply line 106. When the operator wishes to drain the water system, valve 107 is opened and pressure from the supply line forces water out of tank 103 through drain mast interconnect line 102 to drain mast 101.

On aircraft that operate with a pressurized cabin, the difference between the internal cabin pressure and the pressure outside the aircraft may be as high as 8 pounds per square inch. This is known as cabin differential pressure. When a water tank is being drained, pressure in the tank may fall below the cabin differential pressure. When this occurs, check valve 105 will open allowing pressure from the cabin to enter the tank 103.

The use of either the cabin differential pressure from line 108 or the potable water pressurization from line 104 will force the water from water tank 103 through drain mast interconnect line 102 to drain mast 101. In comparison to using only one of the cabin differential pressure from line 108 or the potable water pressurization from line 104, the use of both the cabin differential pressure from line 108 or the potable water pressurization from line 104 will increase the rate at which the tank and water lines will drain.

Figure 2:
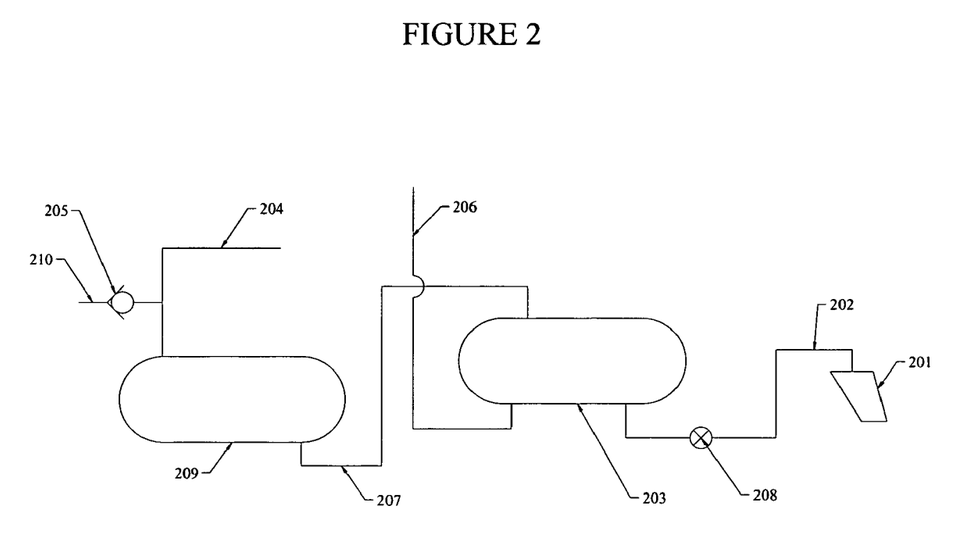
FIG. 2 depicts an embodiment of the present invention with two potable water tanks, a primary and auxiliary water tank, in which a portion of one of the potable water tanks is located below the level of a single-port drain mast.

The aircraft water system depicted in FIG. 2 is comprised of both a primary water tank 203 and an auxiliary water tank 209. In this case, a portion of the auxiliary water tank 209; the interconnect line 207 that connects the auxiliary water tank to the primary water tank; and the line 202 that connect the primary water tank 203 to the drain mast 201 are below the level of the drain mast 201.

When water is distributed throughout the aircraft, pressure is supplied to the system through the pressure supply line 204 which forces water from the auxiliary water tank 209 into the primary water tank 203 and then through the distribution line 206 to the points of use. When the operator wishes to drain the potable water system, valve 208 is opened, which causes pressure from pressure supply line 204 to force water from the auxiliary water tank 209 through interconnect line 207 into the primary water tank 203 where it then travels through the drain mast interconnect line 202 to the drain mast 201.

As in the system shown in FIG. 1, if the pressure in the tanks in FIG. 2 falls below the cabin differential pressure, the check valve 205 will open allowing air from the cabin to enter the auxiliary water tank 209 through the cabin vent line 210 and force water from auxiliary water tank 209 through the interconnect line 207 into the primary water tank 203 where it then travels through the drain mast interconnect line 202 to the drain mast 201.

The use of either the cabin differential pressure from line 210 or the potable water pressurization from line 204 will force the water from auxiliary water tank 209 through the interconnect line 207 into the primary water tank 203 where it then travels through the drain mast interconnect line 202 to the drain mast 201. In comparison to using only one of the cabin differential pressure from line 210 or the potable water pressurization from line 204, the use of both the cabin differential pressure from line 210 or the potable water pressurization from line 204 will increase the rate at which the tanks and water lines will drain.

Figure 3:
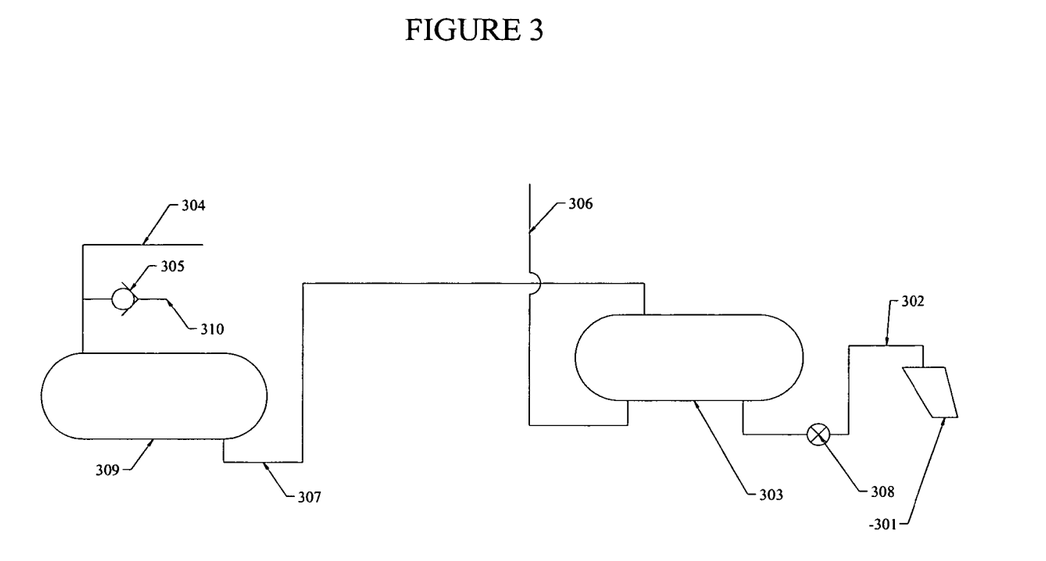
FIG. 3 depicts an embodiment of the present invention in which a portion of the plumbing lines that interconnect the auxiliary water tank to the primary water tank are above the level of the top of the water tanks.

The aircraft water system depicted in FIG. 3 is comprised of a primary water tank 303 and auxiliary water tank 309 where the interconnect line between the two tanks 307 is routed such that it is above the level of both water tanks. When water is distributed throughout the aircraft, pressure is supplied to the system through the pressure supply line 304 which forces water from the auxiliary water tank 309 through the primary to auxiliary water tank interconnect line 307 into the primary water tank 303 and then through the distribution line 306 to the points of use. When the operator wishes to drain the potable water system, valve 308 is opened, which causes pressure from pressure supply line 304 to force water from the auxiliary water tank 309 through interconnect line 307 into the primary water tank 303 where it then travels through the drain mast interconnect line 302 to the drain mast 301.

As in the system shown in FIG. 1, if the pressure in the tanks falls below the cabin differential pressure the check valve 305 will open allowing pressure from the cabin to enter the auxiliary water tank 309. The use of either the cabin differential pressure from line 310 or the potable water pressurization from line 304 will force the water from auxiliary water tank 309 through the interconnect line 307 into the primary water tank 303 where it then travels through the drain mast interconnect line 302 to the drain mast 301. In comparison to using only one of the cabin differential pressure from line 310 or the potable water pressurization from line 304, the use of both the cabin differential pressure from line 310 or the potable water pressurization from line 304 will increase the rate at which the tanks and water lines will drain.

Figure 4:
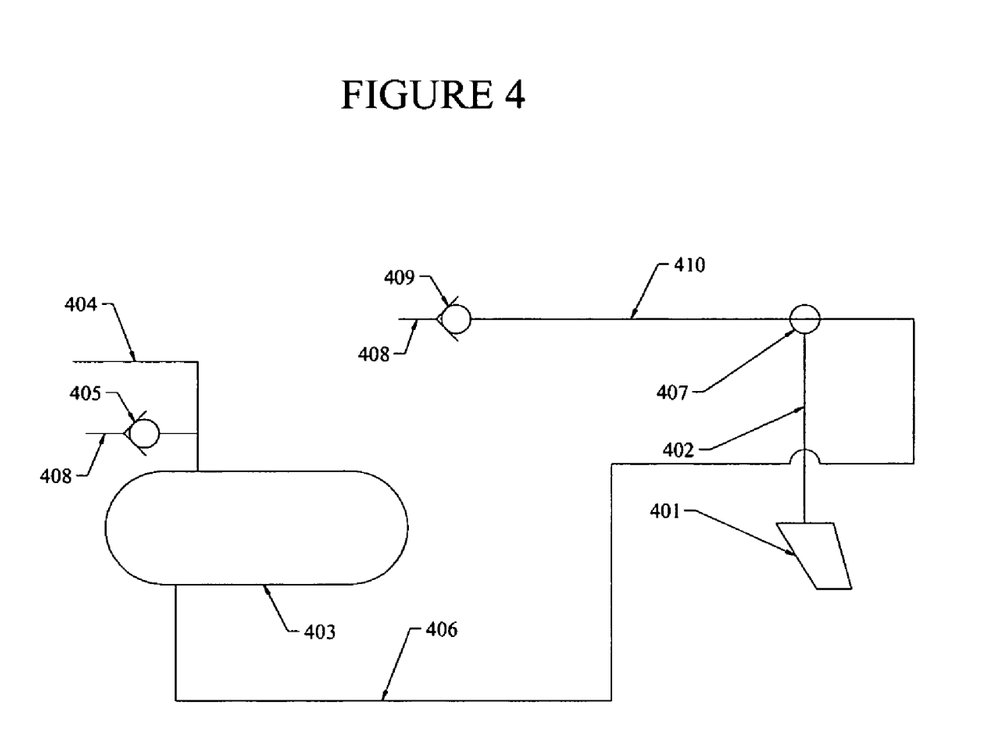
FIG. 4 depicts an embodiment of the present invention with a single potable water tank where a portion of the potable water distribution lines are routed below the level of a single port drain mast and a three position selector valve is used to control distribution of the water and drainage of the system.

The system depicted in FIG. 4 is comprised of a system with a potable water tank 403 and a potable water interconnect line 406 which is routed such that it will not adequately gravity drain through drain mast 401. When water is distributed throughout the aircraft, pressure is supplied to the system through the pressure supply line 404 which forces water from the water tank 403 through the water interconnect line 406 to the three position selector valve 407 which is in the position to allow water to pass through to distribution line 410 and on to points of use. In that position, shown in FIG. 4, the three position selector valve disconnects line 406 from line 402.

Figure 5:
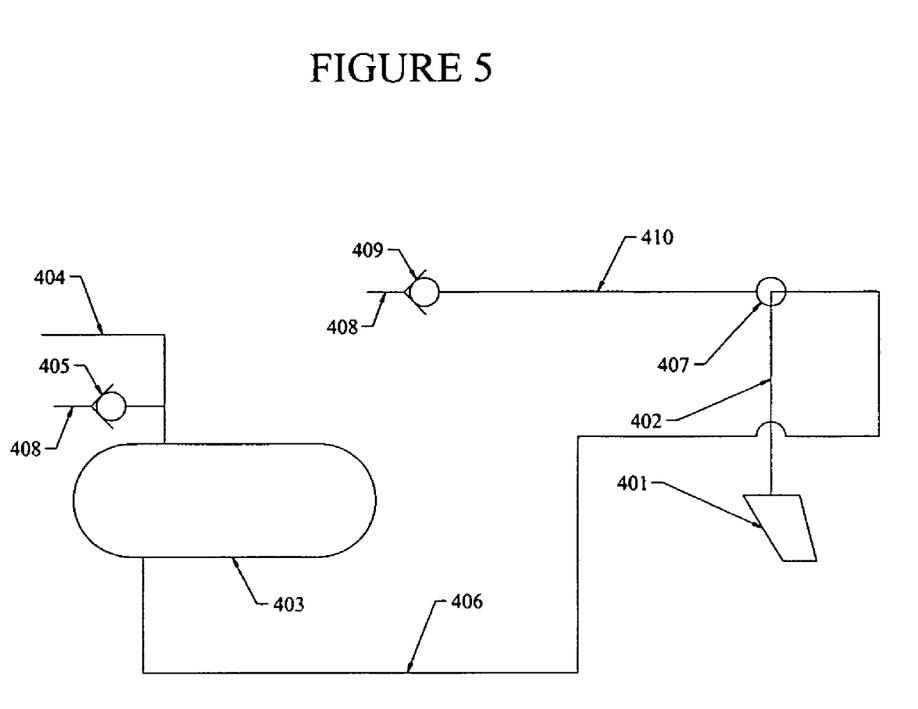
In FIG. 5, the three position selector valve is set to allow water to drain from the potable water tank and the interconnect lines between the potable water tank and the three position selector valve.

When the operator wishes to drain the water system in-flight, the three position selector valve 407 is then set to a position that connects interconnect line 406 to interconnect line 402 allowing water from water tank 403 and interconnect lines 406 and 402 to drain through drain mast 401, as shown in FIG. 5. In that position pressure from the pressure supply line 404 forces water to flow through a portion of the distribution line 406 through interconnect line 402 and out the drain mast 401. FIG. 5 also shows the three position selector valve in a position that disconnects distribution line 410 from both lines 402 and 406.

Figure 6:
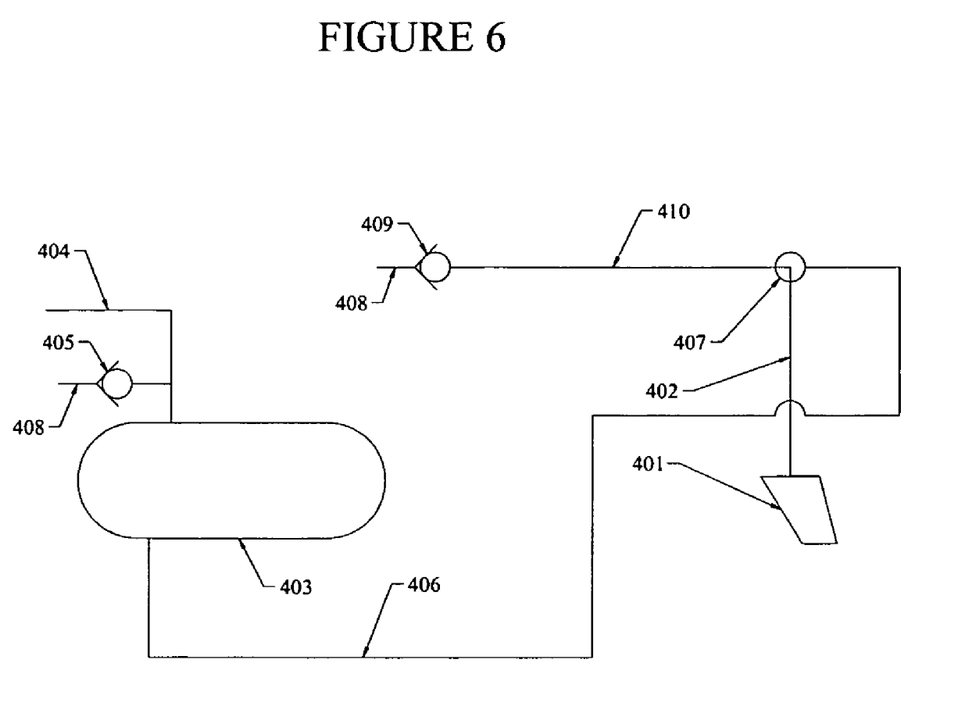
Figure 7:
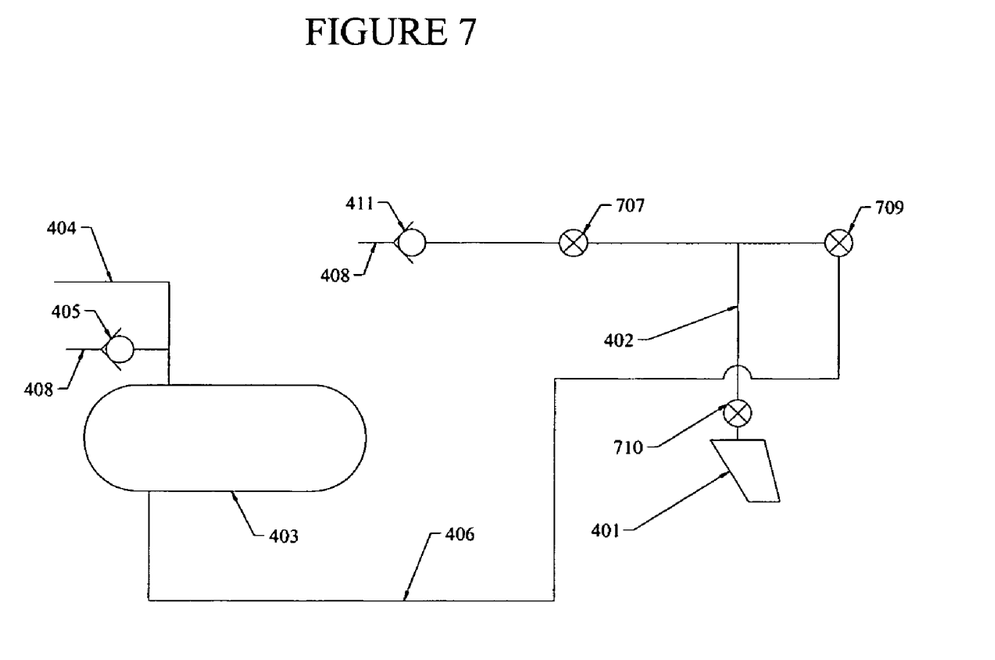
FIG. 7 depicts an embodiment of the present invention with a single potable water tank where a portion of the potable water distribution lines are routed below the level of a single port drain mast and three individual valves are used to control distributing and draining water.

Once the water tank 403 and water distribution line 406 are sufficiently drained, the three position selector valve is repositioned such that distribution line 410 can be drained, as shown in FIG. 6. In FIG. 6, three position selector valve 407 connects distribution line 410 to interconnect line 402 and the water is drained through the drain mast 401 through cabin differential pressure. Cabin differential pressure opens the check valve 409 which forces the water in distribution line 410 to be drained through interconnect line 402 and out the drain mast 401. Cabin differential pressure is supplied through line 408 through check valve 409. In FIG. 6 three position selector valve 407 is positioned such that interconnect line 406 is disconnected from lines 402 and 410. The use of the water system pressure in conjunction with the cabin differential pressure will force the potable water tank 403 and the distribution lines 406 and 410 to be adequately drained in flight. The three position selector valve 407 may be replaced by three individual valves 707, 709, and 710 as shown in FIG. 7.

Figure 8:
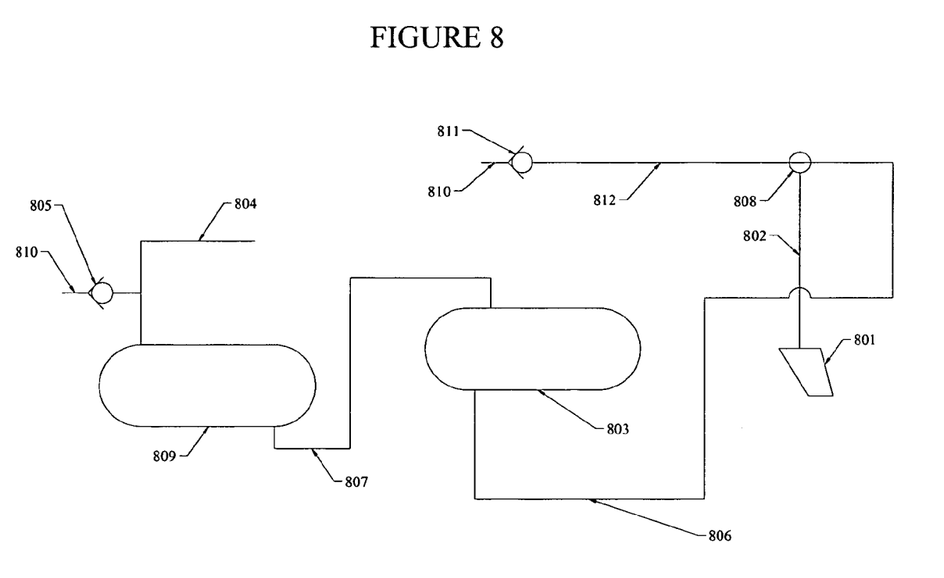
FIG. 8 depicts an embodiment of the present invention with two potable water tanks, primary and auxiliary, in which a portion of the potable water distribution lines are routed below the level of a single port drain mast and a three position selector valve is used to control the draining of the system.

The aircraft system depicted in FIG. 8 is comprised of both a primary water tank 803 and auxiliary water tank 809, primary to auxiliary water tank interconnect line 807 and distribution line 806 routed such that they will not adequately gravity drain through drain mast 801. When water is distributed throughout the aircraft, pressure is supplied through the pressure supply line 804 which forces water from the auxiliary tank 809 through interconnect line 807 and into the primary water tank 803 and then through the interconnect line 806 to the three position selector valve which is set to a position that allows water to pass through to distribution line 812 and on to the points of use. In that position, shown in FIG. 8, the three position selector valve disconnects line 806 from line 802.

Figure 9:
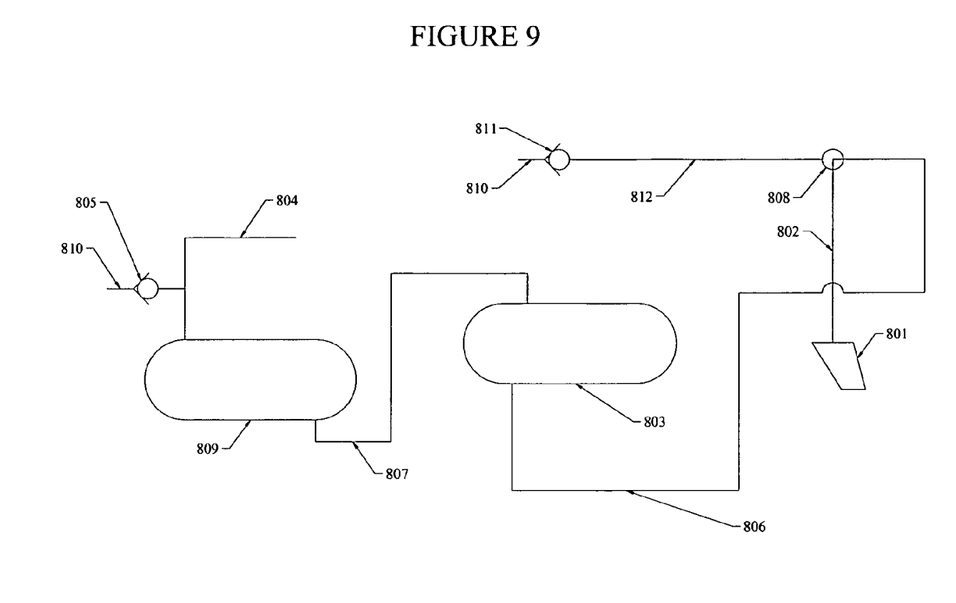
In FIG. 9, the three position selector valve is set to allow water to drain from the potable water tanks and the interconnect lines between the potable water tanks and the three position selector valve.

When the operator wishes to drain the potable water system in-flight, the three position selector valve 808 is repositioned to connect the drain mast 801 through the drain mast interconnect line 802 to the interconnect line 806, as shown in FIG. 9. In FIG. 9 pressure from line 804 is supplied to auxiliary water tank 809, which forces water to flow from the auxiliary potable water tank 809 through the primary to auxiliary water tank interconnect line 807 and into the primary water tank 803 and then through interconnect line 806, and through the drain mast interconnect line 802, and out the drain mast 801. The position of three position selector valve 808 shown in FIG. 9 disconnects distribution line 812 from lines 802 and 806.

Figure 10:
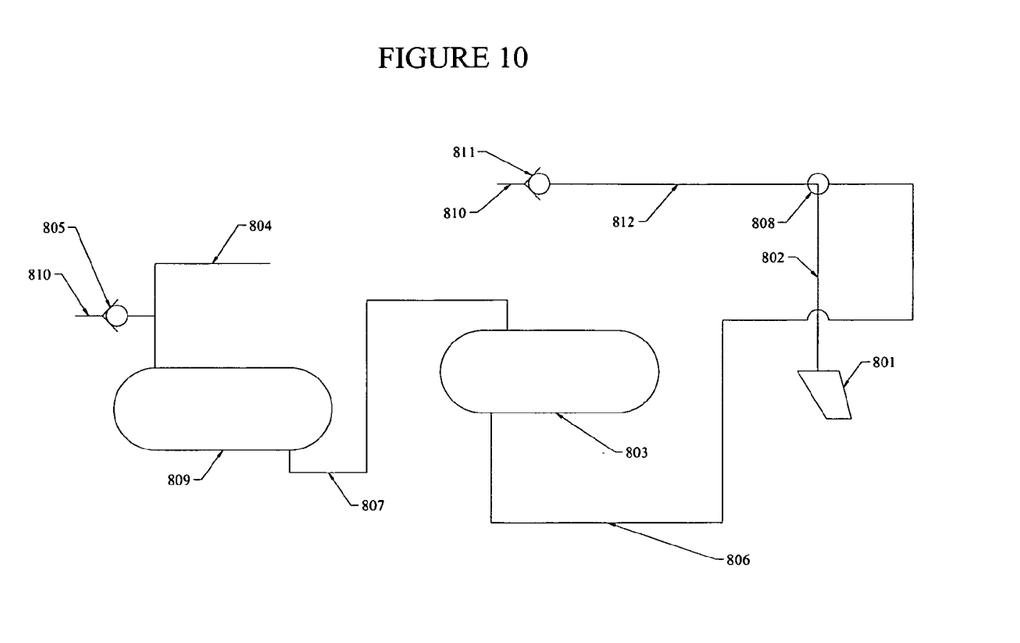
Figure 11:
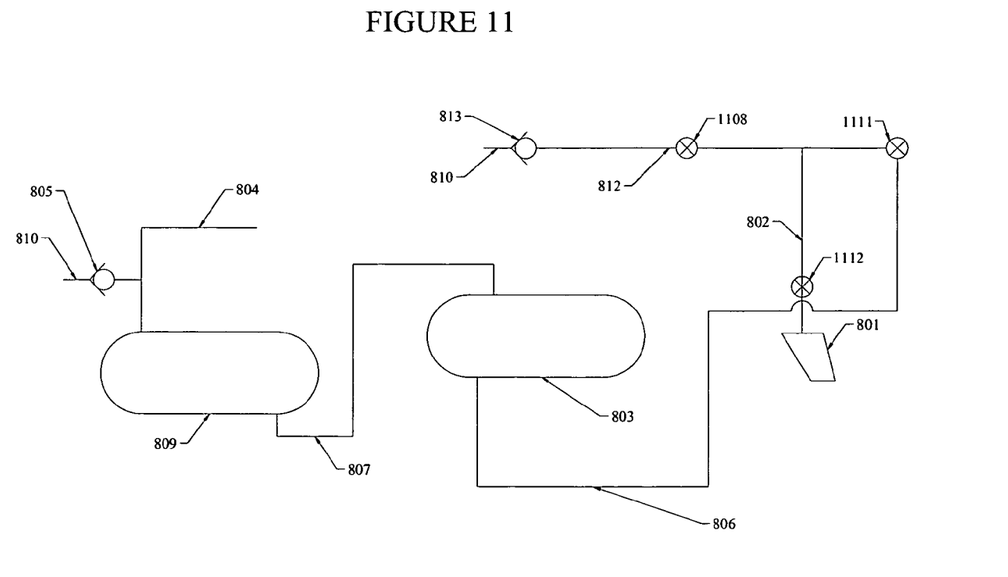
FIG. 11 depicts an embodiment of the present invention with two potable water tanks, primary and auxiliary, in which a portion of the potable water distribution lines are routed below the level of a single port drain mast and three individual valves are used to control the draining of the system.

Once the primary water tank 803 and auxiliary water tank 809, as well as the primary to auxiliary water tank interconnect line 807 and interconnect line 806 are drained, the three position selector valve 808 is repositioned such that distribution line 812 can be drained, as shown in FIG. 10. In FIG. 10 three position selector valve 808 connects distribution line 812 to the drain mast interconnect line 802 and the water is drained through the drain mast 801 using cabin differential pressure. Cabin differential pressure opens the check valve 811 which forces the water in distribution line 812 to be drained through drain mast interconnect line 802 and out the drain mast 801. Cabin pressure enters the check valve 811 through vent line 810. In FIG. 10 three position selector valve 808 is positioned such that interconnect line 806 is disconnected from lines 802 and 812. Three position selector valve 808 may be replaced by three individual valves 1108, 1111, and 1114 as shown in FIG. 11. The use of the water system pressure in conjunction with the cabin differential pressure will force the potable water tank 803, auxiliary water tank 809, the interconnect line 807, the interconnect line 806, the drain mast interconnect line 802, and distribution line 812 to be adequately drained in-flight.

Figure 12:
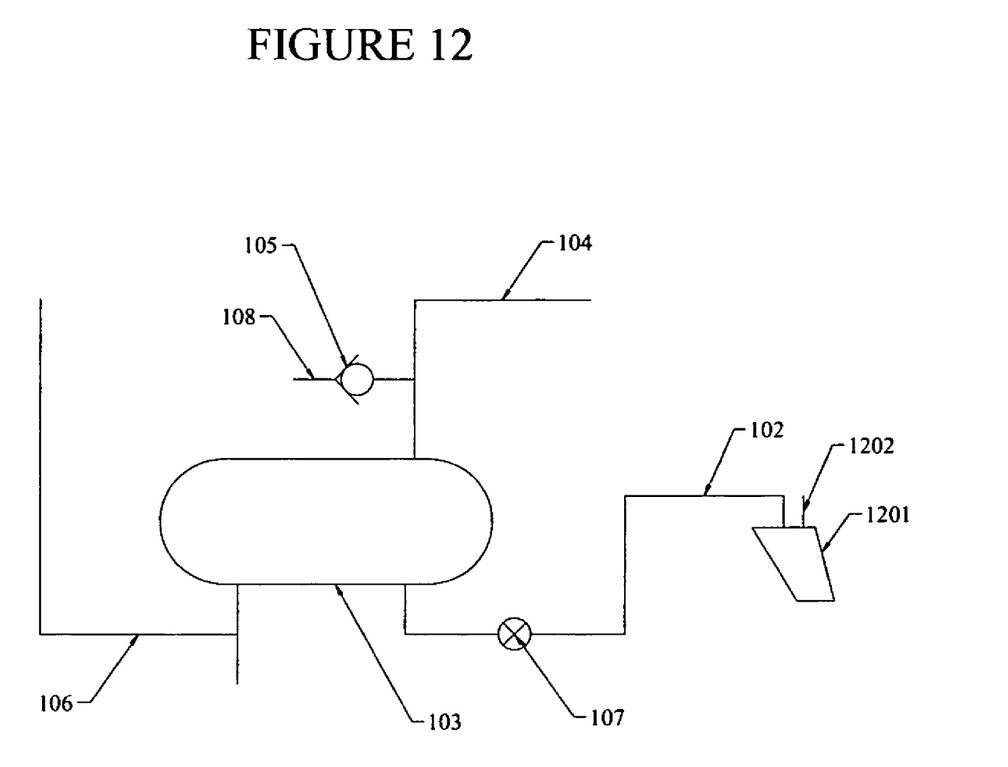
FIG. 12 depicts and embodiment of the present invention with a single water tank, in which a portion of the tank and a portion of the plumbing lines connecting the tank to a dual port drain mast are located below the level of the dual port drain mast.

FIG. 12 depicts an aircraft water system as shown in FIG. 1, except that the drain mast in FIG. 12 is a dual port drain mast, which can be used to separately drain potable water through line 102 and gray water through line 1202. This configuration can be applied to any of the embodiments described herein, such that a dual-port drain mast is used to allow the separate drainage of both potable water and gray water through the same mast. It should also be noted that multiple drain masts, consisting of more than two ports, can be used in kind to drain more than two different liquids separately. Furthermore, the drain masts, either single or multiple-port, can be heated to help prevent liquids from freezing upon exiting the drain.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention.

Specific reference has been made in the description of embodiments of this invention as they relate to potable water drainage of an aircraft in-flight. It should be noted, however, that one of ordinary skill in the art would understand that this invention could be applied to drain other liquids of aircraft and those liquids could be drained either in-flight or on the ground. Furthermore, the representation of the embodiments of this invention are not limited to the specific number of water tanks, plumbing lines, pressure lines, or any other component of an aircraft system that requires drainage as described herein. One of ordinary skill in the art would understand that an aircraft system that requires drainage may be comprised of any number of those components and that this invention encompasses such variations.

In addition, while a particular feature of the invention may have been disclosed with respect to only one of several embodiments, such feature may be combined with one or more other features of the other embodiments as may be desired. Additionally, specific details may have been omitted inasmuch as such details are not considered necessary to obtain a complete understanding of the present invention, and are considered to be within the understanding of persons of ordinary skill in the relevant art.

It is therefore contemplated that the claims will cover any such modifications or embodiments that fall within the true scope of the invention.

What is claimed is:

1. An aircraft system comprising:
   liquid for use by an aircraft;
   a tank storing at least a portion of said liquid;
   a first pressure supply line connected to said tank;
   plumbing connected to said tank;
   said plumbing also connected to a drain; and
   a valve connected to said plumbing, wherein opening the valve allows pressure from the first pressure supply line to force at least a portion of said liquid out of the tank and plumbing through the drain;
   a second pressure supply line connected to the tank;
   an aircraft cabin containing air pressure, wherein said second pressure line is connected to the aircraft cabin for access to said cabin air pressure; and
   a second valve connected to said second pressure supply line, such that it regulates whether the air pressure from the cabin is introduced into the tank to force at least a portion of said liquid out of the tank and the plumbing through the drain.

2. The system of claim 1 wherein at least a section of the tank is below the drain.

3. The system of claim 1 wherein at least a section of the plumbing is below the drain.

4. The system of claim 1 wherein said liquid is potable water.

5. The system of claim 1 wherein said first pressure supply line is used for forcing at least a portion of said liquid to distribution points of the aircraft.

6. The system of claim 1 wherein said first pressure supply line is supplied by cabin differential pressure.

7. An aircraft system comprising:
   liquid for use by an aircraft;
   a first tank storing a portion of said liquid;
   a second tank storing a portion of said liquid;
   a first plumbing connecting the first tank to the second tank;
   a drain;
   a second plumbing connecting the second tank to the drain;
   a first pressure supply line connected to the first tank; and
   a valve connected to the second plumbing and, when said valve is opened, pressure from said first pressure supply line forces at least a portion of said liquid out of the first tank, through the first plumbing, into the second tank, through the second plumbing, and through the drain;
   a second pressure supply line;
   said second pressure supply line connected to the first tank; and
   an aircraft cabin containing air pressure, wherein said second pressure line is connected to the aircraft cabin for access to said cabin air pressure; and
   a second valve connected to said second pressure supply line, such that it regulates whether the air pressure from the cabin is introduced into the first tank to force at least a portion of said liquid out of the first tank, through the first plumbing, into the second tank, through the second plumbing, and through the drain.

8. The system of claim 7, wherein said first pressure supply line is used for forcing at least a portion of said liquid to distribution points of the aircraft.

9. The system of claim 7, wherein said first pressure supply line is supplied by cabin differential pressure.

10. The system of claim 7, 8 and 9 wherein at least a portion of the first or second liquid tank, or at least a portion of the first or second pipe, is below the drain.

* * * * *